United States Patent
Shetty et al.

(10) Patent No.: US 10,175,372 B2
(45) Date of Patent: Jan. 8, 2019

(54) BIN CONSTRAINTS FOR GENERATING A HISTOGRAM OF MICROSEISMIC DATA

(71) Applicant: Halliburton Energy Services, Inc., Houston, TX (US)

(72) Inventors: Dinesh Ananda Shetty, Houston, TX (US); Avi Lin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 15/126,165

(22) PCT Filed: Apr. 30, 2014

(86) PCT No.: PCT/US2014/036067
§ 371 (c)(1),
(2) Date: Sep. 14, 2016

(87) PCT Pub. No.: WO2015/167502
PCT Pub. Date: Nov. 5, 2015

(65) Prior Publication Data
US 2017/0097429 A1  Apr. 6, 2017

(51) Int. Cl.
*G01V 1/28* (2006.01)

(52) U.S. Cl.
CPC ...... *G01V 1/288* (2013.01); *G01V 2210/1234* (2013.01); *G01V 2210/646* (2013.01)

(58) Field of Classification Search
CPC .......... G01V 1/288; G01V 2210/1234; G01V 2210/646
USPC .............. 702/11, 16; 166/250.1; 367/31, 37; 703/2
See application file for complete search history.

(56) References Cited

U.S. PATENT DOCUMENTS

| | | |
|---|---|---|
| 2011/0120702 A1 | 5/2011 | Craig |
| 2013/0044567 A1 | 2/2013 | Kratz |
| 2013/0100769 A1 | 4/2013 | Riley et al. |
| 2013/0304437 A1 | 11/2013 | Ma et al. |
| 2014/0098634 A1 | 4/2014 | Lin |
| 2014/0100786 A1* | 4/2014 | Ma .................. G01V 1/288 702/16 |
| 2014/0100833 A1* | 4/2014 | Williams ............ G01V 1/288 703/10 |

FOREIGN PATENT DOCUMENTS

WO   2015167502 A1   11/2015

* cited by examiner

*Primary Examiner* — John H Le
(74) *Attorney, Agent, or Firm* — John W. Wustenberg; Parker Justiss, P.C.

(57) ABSTRACT

Systems, methods and software can be used for processing microseismic data from a subterranean region. In some aspects, groupings of data points are identified. The data points are based on microseismic data from a subterranean region. The identification of the groupings is constrained such that each grouping includes at least a minimum number of the data points, and such that the data points in each grouping have at most a maximum extent of variation. In some instances, a histogram of the data points is generated, and each of the identified groupings corresponds to a bin in the histogram.

16 Claims, 8 Drawing Sheets

BIN CONSTRAINTS FOR GENERATING A HISTOGRAM OF MICROSEISMIC DATA

CROSS-REFERENCE TO RELATED APPLICATION

This application is the National Stage of, and therefore claims the benefit of, International Application No. PCT/US2014/036067 filed on Apr. 30, 2014, entitled "BIN CONSTRAINTS FOR GENERATING A HISTOGRAM OF MICROSEISMIC DATA," which was published in English under International Publication Number WO 2015/167502 on Nov. 5, 2015. The above application is commonly assigned with this National Stage application and is incorporated herein by reference in its entirety.

BACKGROUND

This specification relates to generating a histogram of microseismic data.

Microseismic data are often acquired in association with hydraulic fracturing treatments applied to a subterranean formation. The hydraulic fracturing treatments are typically applied to induce artificial fractures in the subterranean formation, and to thereby enhance hydrocarbon productivity of the subterranean formation. The pressures generated by the fracture treatment can induce low-amplitude or low-energy seismic events in the subterranean formation, and the events can be detected by sensors and collected for analysis.

DESCRIPTION OF DRAWINGS

Like reference symbols in the various drawings indicate like elements.

DETAILED DESCRIPTION

Figure 1A:
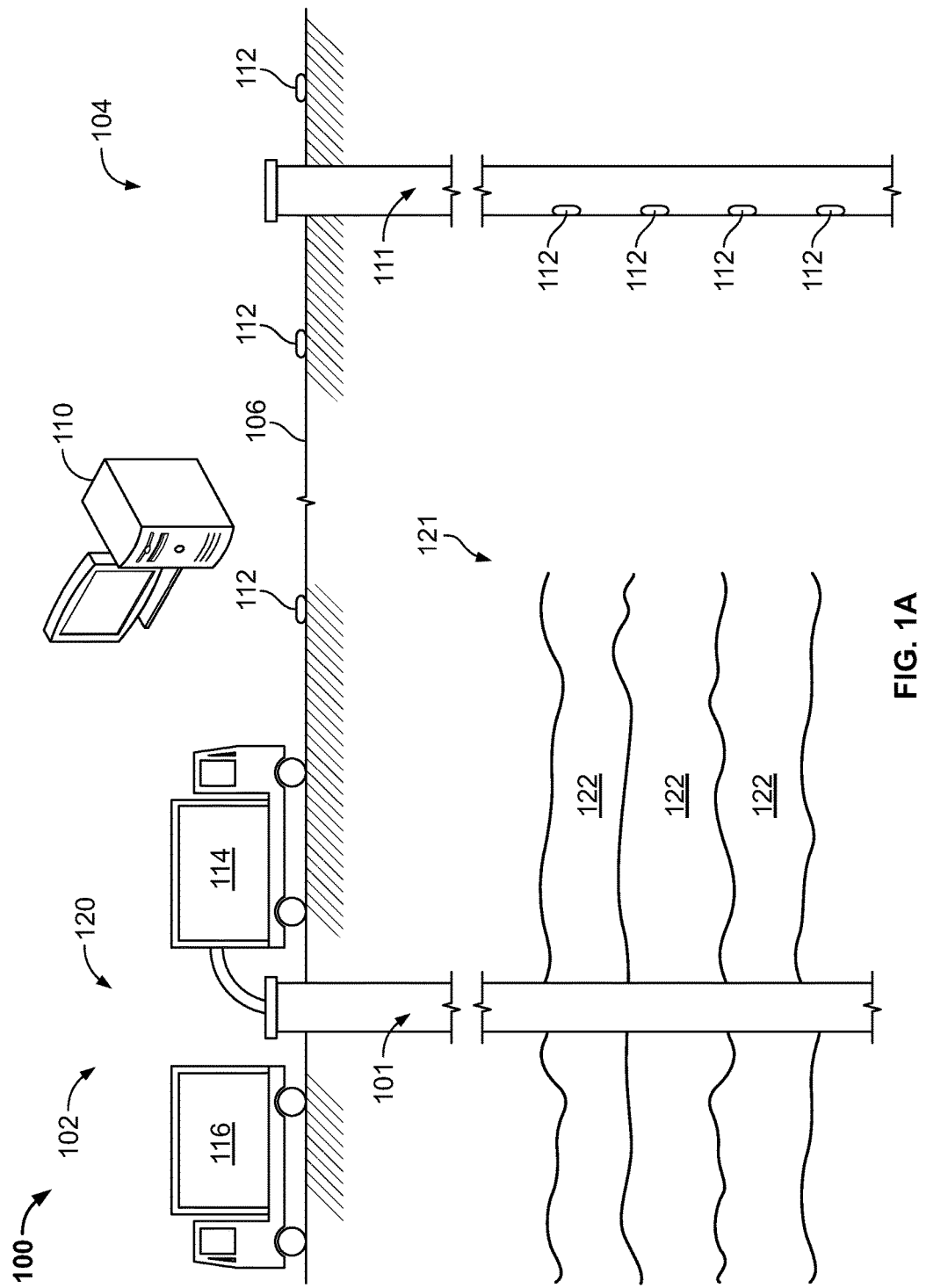
FIG. 1A is a diagram of an example well system.

FIG. 1A shows a schematic diagram of an example well system 100 with a computing subsystem 110. The example well system 100 includes a treatment well 102 and an observation well 104. The observation well 104 can be located remotely from the treatment well 102, near the treatment well 102, or at another location. The well system 100 can include one or more additional treatment wells, observation wells, or other types of wells. The computing subsystem 110 can include one or more computing devices or systems located at the treatment well 102, at the observation well 104, or in other locations. The computing subsystem 110 or any of its components can be located apart from the other components shown in FIG. 1A. For example, the computing subsystem 110 can be located at a data processing center, a computing facility, or another location. The well system 100 can include additional or different features, and the features of the well system can be arranged as shown in FIG. 1A or in another configuration.

The example treatment well 102 includes a well bore 101 in a subterranean zone 121 beneath the surface 106. The subterranean zone 121 can include all or part of a rock formation, or the subterranean zone 121 can include more than one rock formation. In the example shown in FIG. 1A, the subterranean zone 121 includes various subsurface layers 122. The subsurface layers 122 can be defined by geological, stratigraphic, or other properties of the subterranean zone 121. For example, each of the subsurface layers 122 can correspond to a particular lithology, a particular fluid content, a particular stress or pressure profile, or another characteristic. In some cases, one or more of the subsurface layers 122 can be a fluid reservoir that contains hydrocarbons or other types of fluids. One or more of the subsurface layers 122 can include sandstone, carbonate materials, shale, coal, mudstone, granite, or other materials.

The example treatment well 102 includes an injection treatment subsystem 120, which includes instrument trucks 116, pump trucks 114, and other equipment. The injection treatment subsystem 120 can apply an injection treatment to the subterranean zone 121 through the well bore 101. The injection treatment can be a fracture treatment that fractures the subterranean zone 121. For example, the injection treatment may initiate, propagate, or open fractures in one or more of the subsurface layers 122. A fracture treatment may include a mini fracture test treatment, a regular or full fracture treatment, a multi-stage fracture treatment, a follow-on fracture treatment, a re-fracture treatment, a final fracture treatment or another type of fracture treatment.

The fracture treatment can inject a treatment fluid into the subterranean zone 121, for example, at one or more fluid pressures or fluid flow rates. Fluids can be injected above, at or below a fracture initiation pressure, above at or below a fracture closure pressure, or at a combination of these and other fluid pressures. The fracture initiation pressure for a formation is the minimum fluid injection pressure that can initiate or propagate artificial fractures in the formation. Application of a fracture treatment may or may not initiate or propagate artificial fractures in the formation. The fracture closure pressure for a formation is the minimum fluid injection pressure that can dilate existing fractures in the subterranean formation. Application of a fracture treatment may or may not dilate natural or artificial fractures in the formation.

In the example shown in FIG. 1A, the pump trucks 114 may include mobile vehicles, immobile installations, skids, hoses, tubes, fluid tanks or reservoirs, pumps, valves, or other structures and equipment. In some cases, the pump trucks 114 are coupled to a working string disposed in the well bore 101. During operation, the pump trucks 114 can pump fluid through the working string and into the subterranean zone 121. The pumped fluid can include a pad, proppants, a flush fluid, additives, or other materials.

A fracture treatment can be applied at a single fluid injection location or at multiple fluid injection locations in a subterranean zone, and the fluid may be injected over a single time period or over multiple different time periods. In some cases, a fracture treatment can use multiple different fluid injection locations in a single well bore, multiple fluid injection locations in multiple different well bores, or a combination of these. Moreover, the fracture treatment can inject fluid through a well bore, such as, for example, vertical well bores, slant well bores, horizontal well bores, curved well bores, or a combination of these and others.

In the example shown in FIG. 1A, the instrument trucks 116 can include mobile vehicles, immobile installations, or other structures. The instrument trucks 116 can include an injection control system that monitors and controls the fracture treatment applied by the injection treatment subsystem 120. In some implementations, the injection control system can communicate with other equipment to monitor and control the injection treatment. For example, the instrument trucks 116 may communicate with the pump truck 114, subsurface instruments, and monitoring equipment.

The fracture treatment, as well as other activities and natural phenomena, can generate microseismic events in the subterranean zone 121, and microseismic data can be collected from the subterranean zone 121. For example, the microseismic data can be collected by one or more sensors 112 associated with the observation well 104, or the microseismic data can be collected by other types of systems. The microseismic information detected in the well system 100 can include acoustic signals generated by natural phenomena, acoustic signals associated with a fracture treatment applied through the treatment well 102, or other types of signals. For example, the sensors 112 may detect acoustic signals generated by rock slips, rock movements, rock fractures or other events in the subterranean zone 121. In some cases, the locations of individual microseismic events can be determined based on the microseismic data.

Microseismic events in the subterranean zone 121 may occur, for example, along or near induced pre-existing natural fractures or hydraulic fracture planes induced by fracturing activities. The orientation of a fracture can be influenced by the stress regime, the presence of fracture systems that were generated at various times in the past (e.g., under the same or a different stress orientation).

The observation well 104 shown in FIG. 1A includes a well bore 111 in a subterranean region beneath the surface 106. The observation well 104 includes sensors 112 and other equipment that can be used to detect microseismic information. The sensors 112 may include geophones or other types of listening equipment. The sensors 112 can be located at a variety of positions in the well system 100. In FIG. 1A, sensors 112 are installed at the surface 106 and beneath the surface 106 in the well bore 111. Additionally or alternatively, sensors may be positioned in other locations above or below the surface 106, in other locations within the well bore 111, or within another well bore. The observation well 104 may include additional equipment (e.g., working string, packers, casing, or other equipment) not shown in FIG. 1A. In some implementations, microseismic data are detected by sensors installed in the treatment well 102 or at the surface 106, with or without the use of an observation well.

In some cases, all or part of the computing subsystem 110 can be contained in a technical command center at the well site, in a real-time operations center at a remote location, in another location, or a combination of these. The well system 100 and the computing subsystem 110 can include or access a communication infrastructure. For example, well system 100 can include multiple separate communication links or a network of interconnected communication links. The communication links can include wired or wireless communications systems. For example, sensors 112 may communicate with the instrument trucks 116 or the computing subsystem 110 through wired or wireless links or networks, or the instrument trucks 116 may communicate with the computing subsystem 110 through wired or wireless links or networks. The communication links can include a public data network, a private data network, satellite links, dedicated communication channels, telecommunication links, or a combination of these and other communication links.

The computing subsystem 110 can analyze microseismic data collected in the well system 100. For example, the computing subsystem 110 may analyze microseismic event data from a fracture treatment of a subterranean zone 121. Microseismic data from a fracture treatment can include data collected before, during, or after fluid injection. The computing subsystem 110 can receive the microseismic data at one or more time periods. In some cases, the computing subsystem 110 receives the microseismic data in real time (or substantially in real time) during the fracture treatment. For example, the microseismic data may be sent to the computing subsystem 110 immediately upon detection by the sensors 112. In some cases, the computing subsystem 110 receives some or all of the microseismic data after the fracture treatment has been completed. The computing subsystem 110 can receive the microseismic data, for example, in a format produced by microseismic sensors or detectors, or in another format (e.g., after the microseismic data has been formatted, packaged, or otherwise processed).

Figure 2:
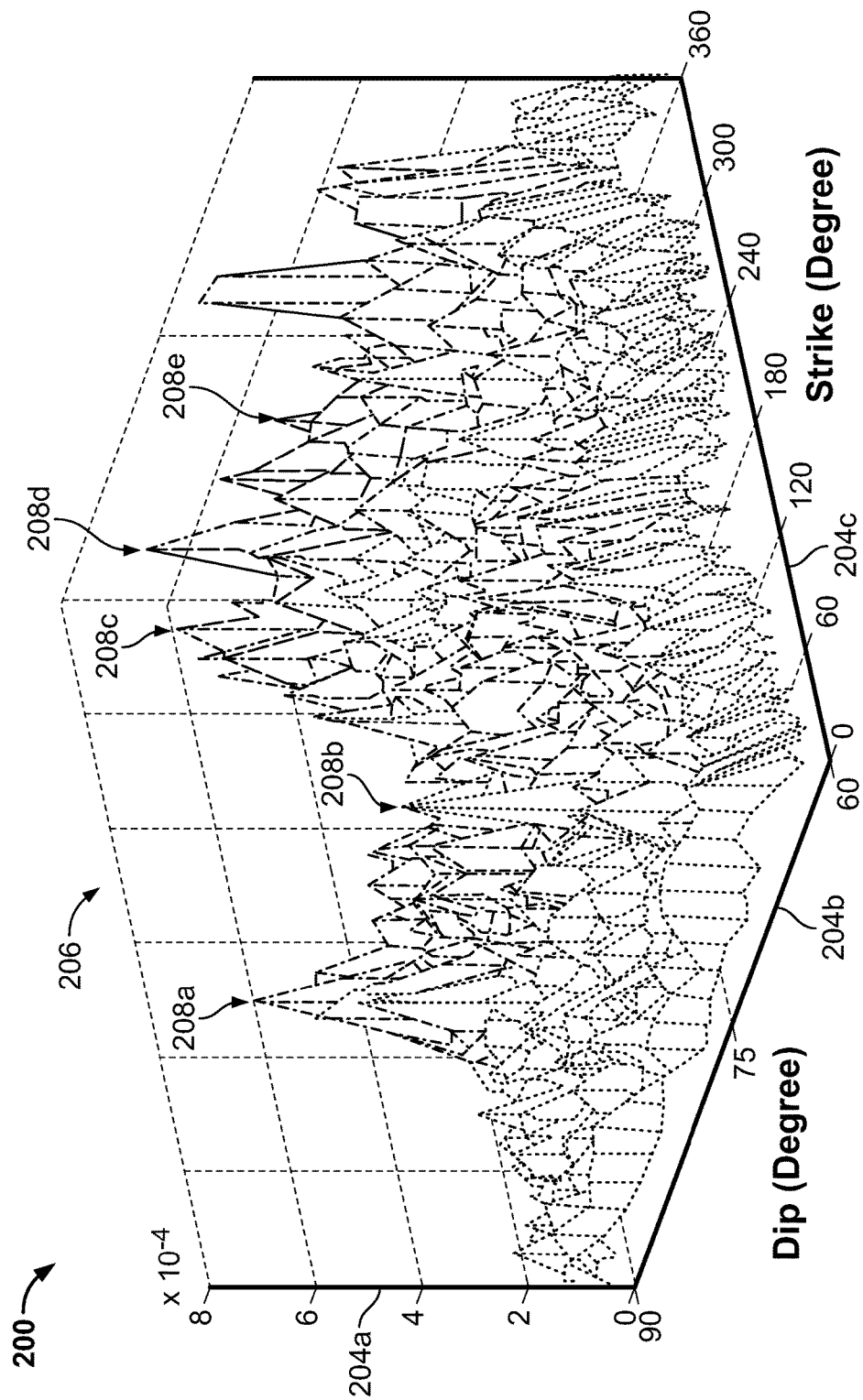
FIG. 2 is a plot showing an example histogram.

The computing subsystem 110 can be used to generate a histogram based on microseismic events. The histogram can be used, for example, to identify dominant fracture orientations in the subterranean zone 121. FIG. 2 shows an example of a histogram. The dominant fracture orientations can be identified, for example, based on local maxima in the histogram data. The dominant fracture orientations can correspond to the orientations of fracture families in the subterranean zone 121. In some cases, the microseismic data corresponding to each dominant fracture orientation are used to generate one or more fracture planes.

Some of the techniques and operations described herein may be implemented by a computing subsystem configured to provide the functionality described. In various embodiments, a computing device may include any of various types of devices, including, but not limited to, personal computer systems, desktop computers, laptops, notebooks, mainframe computer systems, handheld computers, workstations, tablets, application servers, storage devices, or another of computing system or electronic device.

Figure 1B:
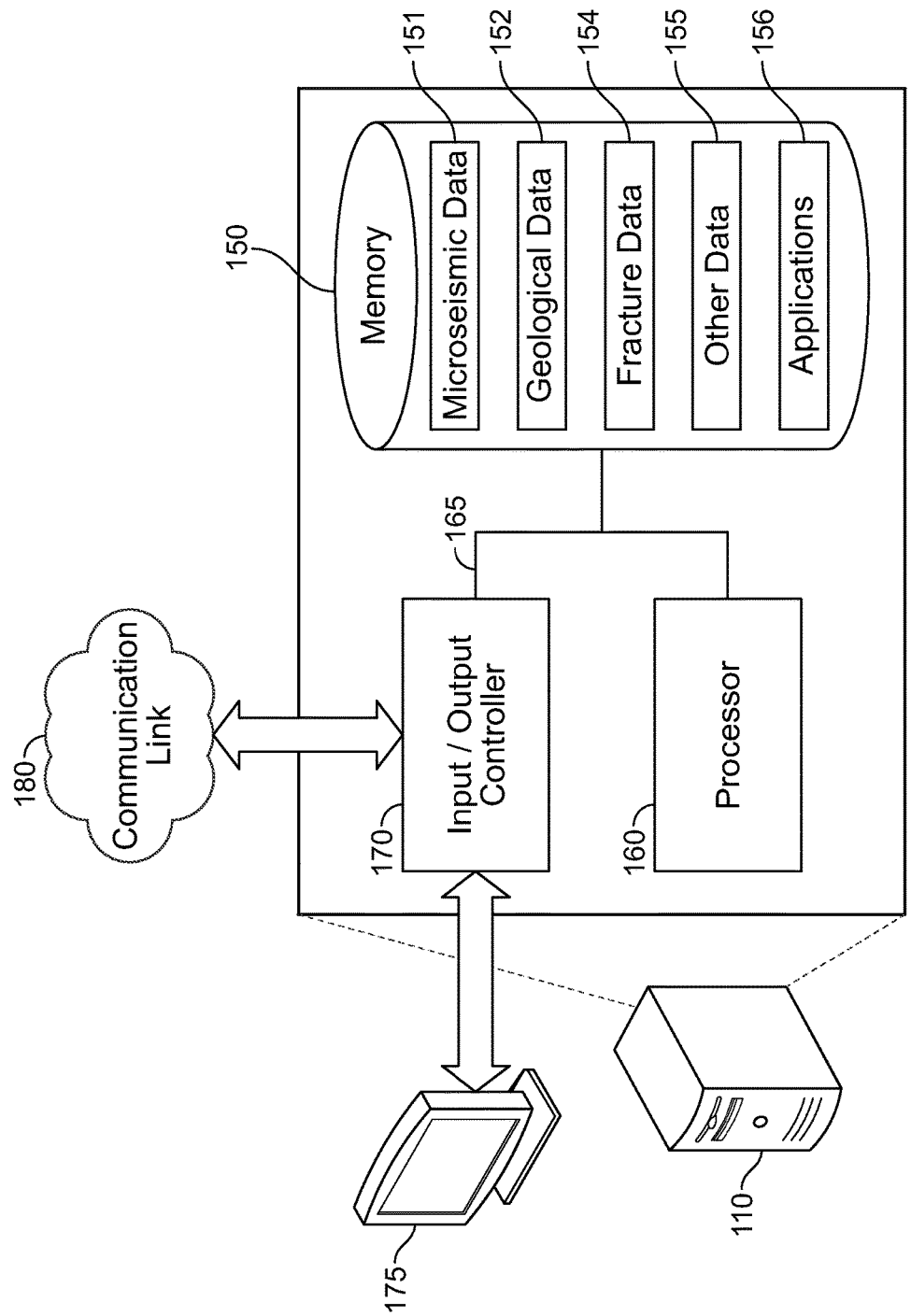
FIG. 1B is a diagram of the example computing subsystem 110 of FIG. 1A.

FIG. 1B is a diagram of the example computing subsystem 110 of FIG. 1A. The example computing subsystem 110 can be located at or near one or more wells of the well system 100 or at a remote location. All or part of the computing subsystem 110 may operate independent of the well system 100 or independent of any of the other components shown in FIG. 1A. The example computing subsystem 110 includes a processor 160, a memory 150, and input/output controllers 170 communicably coupled by a bus 165. The memory can include, for example, a random access memory (RAM), a storage device (e.g., a writable read-only memory (ROM) or others), a hard disk, or another type of storage medium. The computing subsystem 110 can be preprogrammed or it can be programmed (and reprogrammed) by loading a program from another source (e.g., from a CD-ROM, from another computer device through a data network, or in another manner). The input/output controller 170 is coupled to input/output devices (e.g., a monitor 175, a mouse, a keyboard, or other input/output devices) and to a communication link 180. The input/output devices receive and transmit data in analog or digital form over communication links such as a serial link, a wireless link (e.g., infrared, radio frequency, or others), a parallel link, or another type of link.

The communication link 180 can include any type of communication channel, connector, data communication network, or other link. For example, the communication link 180 can include a wireless or a wired network, a Local Area Network (LAN), a Wide Area Network (WAN), a private network, a public network (such as the Internet), a WiFi network, a network that includes a satellite link, or another type of data communication network.

The memory 150 can store instructions (e.g., computer code) associated with an operating system, computer applications, and other resources. The memory 150 can also store application data and data objects that can be interpreted by one or more applications or virtual machines running on the computing subsystem 110. As shown in FIG. 1B, the example memory 150 includes microseismic data 151, geological data 152, fracture data 153, other data 155, and applications 156. In some implementations, a memory of a computing device includes additional or different information.

The microseismic data 151 can include information on the locations of microseisms in a subterranean zone. For example, the microseismic data can include information based on acoustic data detected at the observation well 104, at the surface 106, at the treatment well 102, or at other locations. The microseismic data 151 can include information collected by sensors 112. In some cases, the microseismic data 151 has been combined with other data, reformatted, or otherwise processed. The microseismic event data may include information relating to microseismic events (locations, magnitudes, uncertainties, times, etc.). The microseismic event data can include data collected from one or more fracture treatments, which may include data collected before, during, or after a fluid injection.

The geological data 152 can include information on the geological properties of the subterranean zone 121. For example, the geological data 152 may include information on the subsurface layers 122, information on the well bores 101, 111, or information on other attributes of the subterranean zone 121. In some cases, the geological data 152 includes information on the lithology, fluid content, stress profile, pressure profile, spatial extent, or other attributes of one or more rock formations in the subterranean zone. The geological data 152 can include information collected from well logs, rock samples, outcroppings, seismic imaging, or other data sources.

The fracture data 153 can include information on fracture planes in a subterranean zone. The fracture data 153 may identify the locations, sizes, shapes, and other properties of fractures in a model of a subterranean zone. The fracture data 153 can include information on natural fractures, hydraulically-induced fractures, or any other type of discontinuity in the subterranean zone 121. The fracture data 153 can include fracture planes calculated from the microseismic data 151. For each fracture plane, the fracture data 153 can include information (e.g., strike angle, dip angle, etc.) identifying an orientation of the fracture, information identifying a shape (e.g., curvature, aperture, etc.) of the fracture, information identifying boundaries of the fracture, or other information.

The applications 156 can include software applications, scripts, programs, functions, executables, or other modules that are interpreted or executed by the processor 160. Such applications may include machine-readable instructions for performing one or more of the operations represented in FIGS. 4 and 5. The applications 156 may include machine-readable instructions for generating a user interface or a plot, such as, for example, the histogram represented in FIG. 2. The applications 156 can obtain input data, such as microseismic data, geological data, or other types of input data, from the memory 150, from another local source, or from one or more remote sources (e.g., via the communication link 180). The applications 156 can generate output data and store the output data in the memory 150, in another local medium, or in one or more remote devices (e.g., by sending the output data via the communication link 180).

The processor 160 can execute instructions, for example, to generate output data based on data inputs. For example, the processor 160 can run the applications 156 by executing or interpreting the software, scripts, programs, functions, executables, or other modules contained in the applications 156. The processor 160 may perform one or more of the operations represented in FIG. 4 or 5, or it may generate the histogram shown in FIG. 2. The input data received by the processor 160 or the output data generated by the processor 160 can include any of the microseismic data 151, the geological data 152, the fracture data 154, or the other data 155.

FIG. 2 is a plot showing an example histogram 200. The example histogram 200 shown in FIG. 2 is a graphical representation of the distribution of basic plane orientations identified from a set of microseismic data. A histogram can be generated based on other types of data, and a histogram can represent other types of information. The example histogram 200 can be generated by the example techniques represented in FIGS. 4 and 5, or by another technique.

The example histogram 200 shown in FIG. 2 includes a plot of a surface 206 representing fracture plane orientation probabilities. In some cases, a histogram includes another type of plot. For example, a histogram can convey the same or similar information by a bar plot, a topographical plot, or another type of plot. In the example shown in FIG. 2, each fracture plane orientation is represented by two variables—the strike angle and the dip angle. A histogram can be used to represent a distribution of quantities over one variable, two variables, three variables, or more.

The surface 206 shown in FIG. 2 is plotted in a three-dimensional coordinate system. Some example histograms are plotted in two dimensions (e.g., for a distribution over a single variable), three dimensions (e.g., for a distribution over two variables), or four dimensions (e.g., for a distribution over two variables over time). In the example shown in FIG. 2, the three-dimensional coordinate system is represented by the vertical axis 204a and the two horizontal axes 204b and 204c. The horizontal axis 204b represents a range of dip angles, and the horizontal axis 204c represents a range of strike angles (units of degrees). The vertical axis 204a represents a range of probabilities.

Parameters of the histogram 200 can be computed, for example, by generating bins that each represent a distinct orientation range or grouping. For example, a bin can represent a range of strike angles and a range of dip angles. In some instances, each bin corresponds to a grouping of data points, and the range for each individual bin is based on the data points one of the groupings. For example, the groupings can be identified based on the example process shown in FIG. 5, and a histogram bin can be created for each identified grouping. In the histogram 200 shown in FIG. 2, each of the histogram bins corresponds to an intersection of sub-ranges along the horizontal axes 204b and 204c.

Additional parameters of the histogram 200 can be computed, for example, by computing the quantity of fracture orientations associated with each bin. In the histogram 200 shown in FIG. 2, the quantity for each bin is represented by the level of the surface 206 for each of the groupings represented in the plot. The quantities represented in FIG. 2 are normalized probability values. Generally, the quantity for each bin in a histogram can be a normalized quantity or a non-normalized quantity. For example, the quantity of fracture planes for each bin can be a probability value, a frequency value, an integer number value, or another type of value.

The quantity of fracture planes for each bin of the histogram can be computed, for example, by assigning each fracture plane, by assigning each identified grouping of fracture planes to a bin, or by a combination of these and other techniques. In some cases, the fracture planes are basic planes defined by microseismic data points, and each of the basic planes defines an orientation corresponding to one of the bins.

The example histogram 200 represents the probability distribution of basic planes associated with 180 microseismic events. In this example, each bin represents a sub-range of strike values within the strike range indicated in the histogram 200 (0° through 360°) and a sub-range of dip values within the dip range indicated in the histogram 200 (60° through 90°). The surface 206 map exhibits several local maxima (peaks), five of which are labeled as 208a, 208b, 208c, 208d, and 208e in FIG. 2.

The peaks in the histogram 200 represent the bins associated with higher quantities than surrounding bins. The bins represented by the peaks correspond to a set of fracture planes having similar or parallel orientations. In some cases, each local maximum (or peak) in the histogram can be considered as corresponding to a dominant (i.e., principal) orientation trend. An orientation trend can be considered a dominant fracture orientation, for example, when more basic planes are aligned along this direction than along its neighboring or nearby directions. A dominant fracture orientation can represent a statistically significant quantity of basic planes that are either parallel, substantially parallel, or on the same plane.

The example shown in FIG. 2 is a histogram based on two angular parameters of each basic plane (i.e., strike and dip angles). A histogram can be based on other parameters of the basic planes. For example, a third parameter of each basic plane can be incorporated in the histogram data. The third parameter can be, for example, the distance d of the basic plane from the origin. A histogram can be generated for distance-related parameters, orientation-related parameters, or combinations of them. In some examples, a histogram can be generated for the values d tan ($\theta$) and d tan ($\varphi$) for each basic plane, based on the distance d of each basic plane from the origin, the strike angle $\varphi$ of each basic plane, and the dip angle $\theta$ of each basic plane. In some cases, a two dimensional histogram can be generated based on any two independent variables, such as, for example, tan ($\theta$), tan ($\varphi$), the strike angle $\varphi$, the dip angle $\theta$, or others.

Figure 3A:
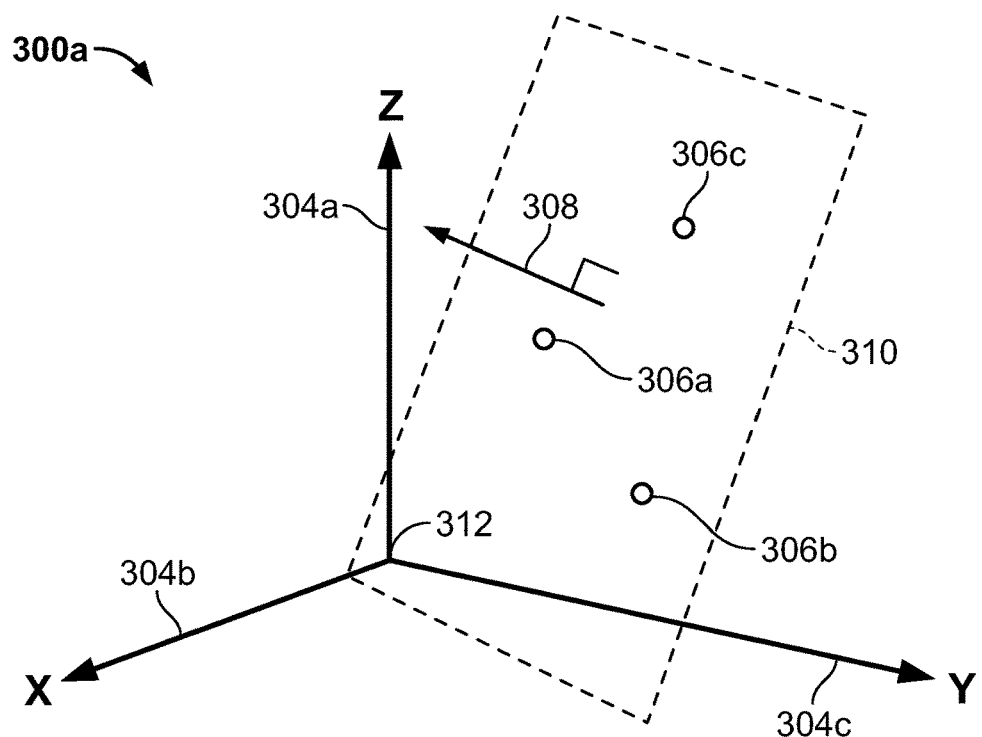
FIGS. 3A and 3B are plots showing an example fracture plane orientation.
Figure 3B:
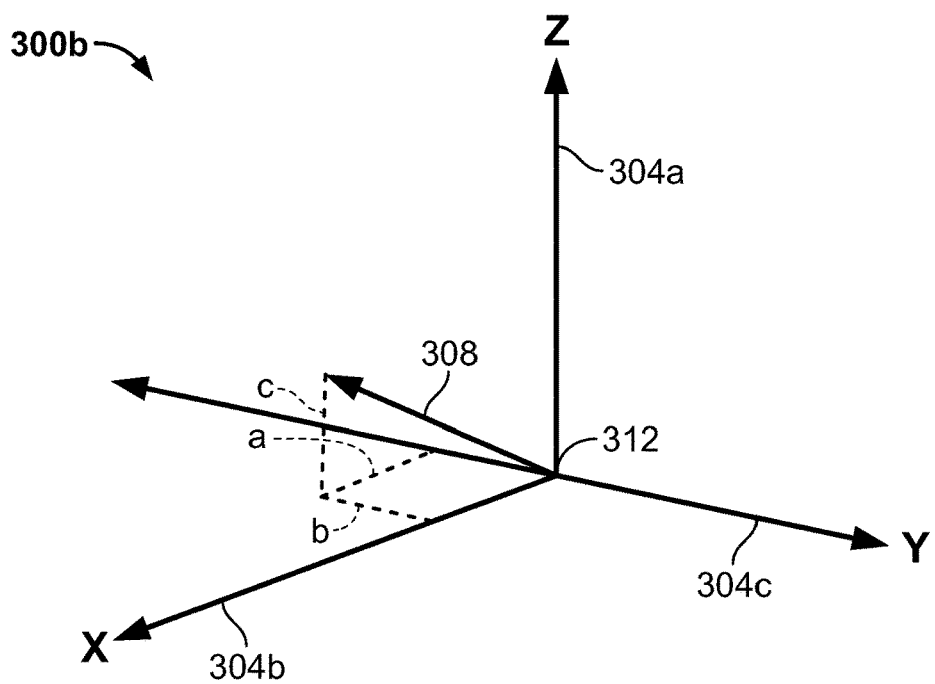

FIGS. 3A and 3B are plots showing an example fracture plane orientation. FIG. 3A shows a plot 300a of an example basic plane 310 defined by three non-collinear microseismic events 306a, 306b, and 306c. FIG. 3B shows a plot 300b of the normal vector 308 for the basic plane 310 shown in FIG. 3A. In FIGS. 3A and 3B, the vertical axis 304a represents the z-coordinate, the horizontal axis 304b represents the x-coordinate, and the horizontal axis 304c represents the y-coordinate. The plots 300a and 300b show a rectilinear coordinate system; other types of coordinate systems (e.g., spherical, elliptical, etc.) can be used.

As shown in FIG. 3A, the basic plane 310 is a two-dimensional surface that extends through the three-dimensional xyz-coordinate system. The normal vector 308 indicates the orientation of the basic plane 310. A normal vector can be a unit vector (a vector having unit length) or a normal vector can have non-unit length.

As shown FIG. 3B, the normal vector 308 has vector components (a, b, c). The vector components (a, b, c) can be computed, for example, based on the positions of the microseismic events 306a, 306b, and 306c, based on the parameters of the basic plane 310, or based on other information. In the plot 300b, the x-component of the normal vector 308 is represented as the length a along the x-axis, the y-component of the normal vector 308 is represented as the length b along the y-axis, and the z-component of the normal vector 308 is represented as the length c along the z-axis. (In the example shown, the y-component b is a negative value.)

The orientation of the basic plane 310 can be computed from the normal vector 308, the microseismic events themselves, parameters of the basic plane 310, other data, or any combination of these. For example, the dip $\theta$ and the strike $\varphi$ of the basic plane 310 can be computed from the normal vector 308 based on the equations $$\theta = \arctan\frac{\sqrt{a^2+b^2}}{c}, \varphi = \arctan\frac{b}{a}. \tag{1}$$

In some cases, computational techniques can account for and properly manage the sensitivity of these equations in extreme cases, for example, where the parameter a or c is very small.

In some cases, the orientation of one or more basic planes can be used as input for generating histogram data. For example, a histogram of the basic plane orientations can be generated from a set of basic planes. In some cases, the histogram data is generated by assigning each basic plane to a grouping based on the basic plane's orientation ($\theta$, $\varphi$) and computing the quantity of basic planes associated with each bin. In some cases, the histogram is plotted, or the histogram data can be used or processed without displaying the histogram.

Figure 4:
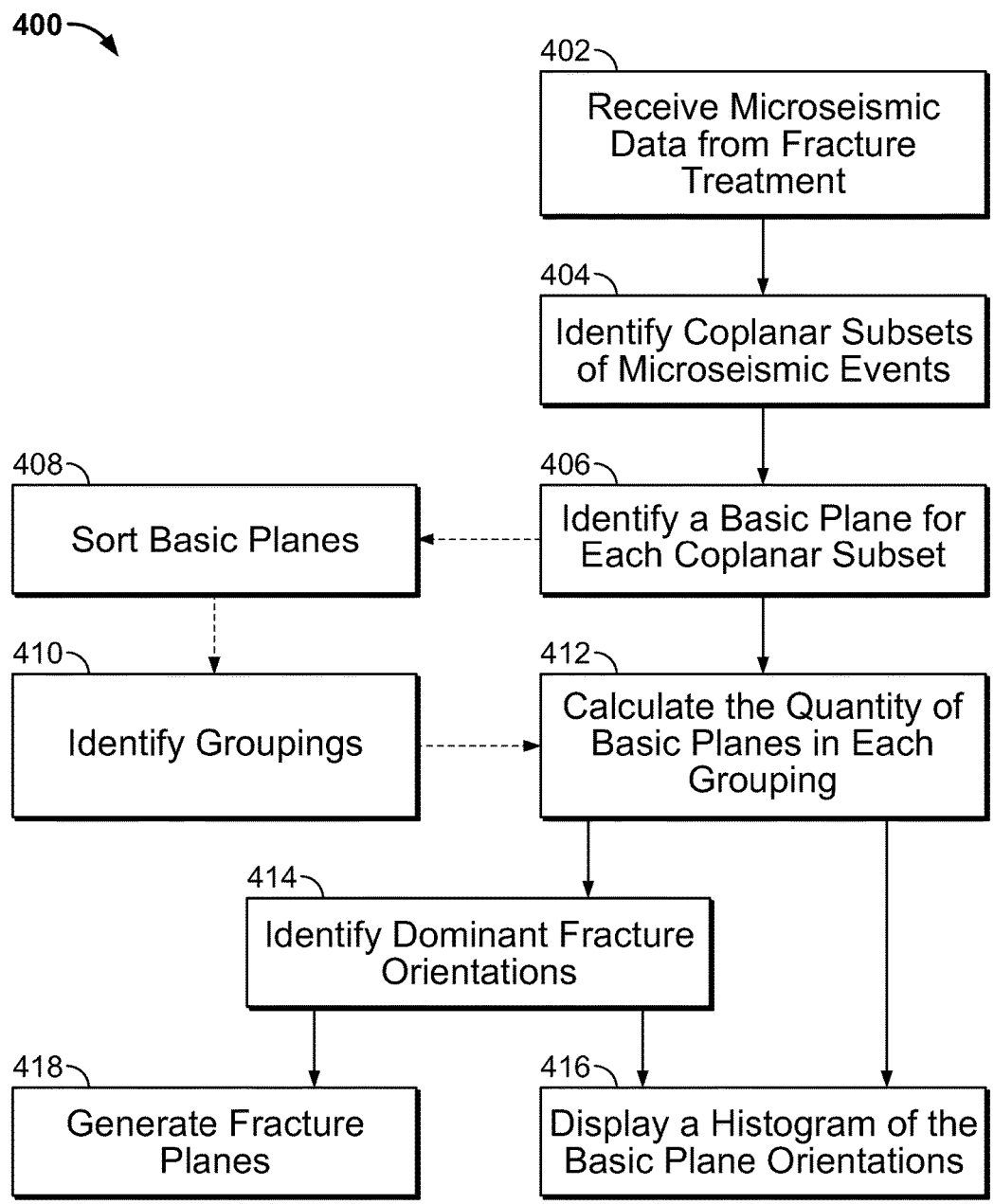
FIG. 4 is a flow chart of an example technique for identifying dominant fracture orientations.

FIG. 4 is a flow chart of an example process 400 for identifying dominant fracture orientations. Some or all of the operations in the process 400 can be implemented by one or more computing devices. In some implementations, the process 400 may include additional, fewer, or different operations performed in the same or a different order. Moreover, one or more of the individual operations or subsets of the operations in the process 400 can be performed in isolation or in other contexts. Output data generated by the process 400, including output generated by intermediate operations, can include stored, displayed, printed, transmitted, communicated or processed information.

In some implementations, some or all of the operations in the process 400 are executed in real time during a fracture treatment. An operation can be performed in real time, for example, by performing the operation in response to receiving data (e.g., from a sensor or monitoring system) without substantial delay. An operation can be performed in real time, for example, by performing the operation while monitoring for additional microseismic data from the fracture treatment. Some real time operations can receive an input and produce an output during a fracture treatment; in some cases, the output is made available to a user within a time frame that allows the user to respond to the output, for example, by modifying the fracture treatment.

In some cases, some or all of the operations in the process 400 are executed dynamically during a fracture treatment.

An operation can be executed dynamically, for example, by iteratively or repeatedly performing the operation based on additional inputs, for example, as the inputs are made available. In some cases, dynamic operations are performed in response to receiving data for a new microseismic event (or in response to receiving data for a certain number of new microseismic events, etc.).

At 402, microseismic data from a fracture treatment are received. For example, the microseismic data can be received from memory, from a remote device, or another source. The microseismic event data may include information on the measured locations of multiple microseismic events, information on a measured magnitude of each microseismic event, information on an uncertainty associated with each microseismic event, information on a time associated with each microseismic event, etc. The microseismic event data can include microseismic data collected at an observation well, at a treatment well, at the surface, or at other locations in a well system. Microseismic data from a fracture treatment can include data for microseismic events detected before, during, or after the fracture treatment is applied. For example, in some cases, microseismic monitoring begins before the fracture treatment is applied, ends after the fracture treatment is applied, or both.

At 404, coplanar subsets of microseismic events are identified. A coplanar subset of microseismic events can include three microseismic events or more than three microseismic events. For example, each subset can be a triplet of microseismic event locations. In some cases, the coplanar subsets are identified by identifying all triplets in a set of microseismic event data. For example, for N microseismic event locations, N(N−1)(N−2)/6 triplets can be identified. In some cases, less than all triplets are identified as subsets. For example, some triplets (e.g., collinear or substantially collinear triplets) may be excluded.

At 406, a basic plane is identified for each coplanar subset of microseismic events. For example, a basic plane can be identified by calculating the parameters of a basic plane based on a triplet of microseismic event locations. In some cases, a plane can be defined by the three parameters a, b, and c of a basic plane model. These parameters can be calculated based on the x, y and z coordinates of three non-collinear points in a subset, for example, by solving a system of linear equations for the three parameters. For example, the parameters of a plane defined by three non-collinear events $(x_1, y_1, z_1)$, $(x_2, y_2, z_2)$ and $(x_3, y_3, z_3)$ can be computed based on solving the following system of equations:

$$ax + by + c + d = 0 \quad (2a)$$

$$a = \begin{bmatrix} 1 & y_1 & z_1 \\ 1 & y_2 & z_2 \\ 1 & y_3 & z_3 \end{bmatrix}, \quad (2b)$$

$$b = \begin{bmatrix} x_1 & 1 & z_1 \\ x_2 & 1 & z_2 \\ x_3 & 1 & z_3 \end{bmatrix}, \quad (2c)$$

$$c = \begin{bmatrix} x_1 & y_1 & 1 \\ x_2 & y_2 & 1 \\ x_3 & y_3 & 1 \end{bmatrix}, \quad (2d)$$

$$d = -\begin{bmatrix} x_1 & y_1 & z_1 \\ x_2 & y_2 & z_2 \\ x_3 & y_3 & z_3 \end{bmatrix}, \quad (2e)$$

At 412, the quantity of basic planes in each of a plurality of groupings is calculated. In some cases, each grouping can be used to generate a respective bin in a histogram. In some cases, each covers an independent, discrete sub-range of orientations. The bins may collectively cover a full range of basic plane orientations, or the bins may collectively cover multiple adjoining or non-adjoining sub-ranges of orientations. Each individual bin may correspond to a solid angle in three-dimensional space. A solid angle can be defined, for example, by a range of dip angles and a range of strike angles, or by angular ranges based on combinations of the strike angle and the dip angle.

Figure 5:
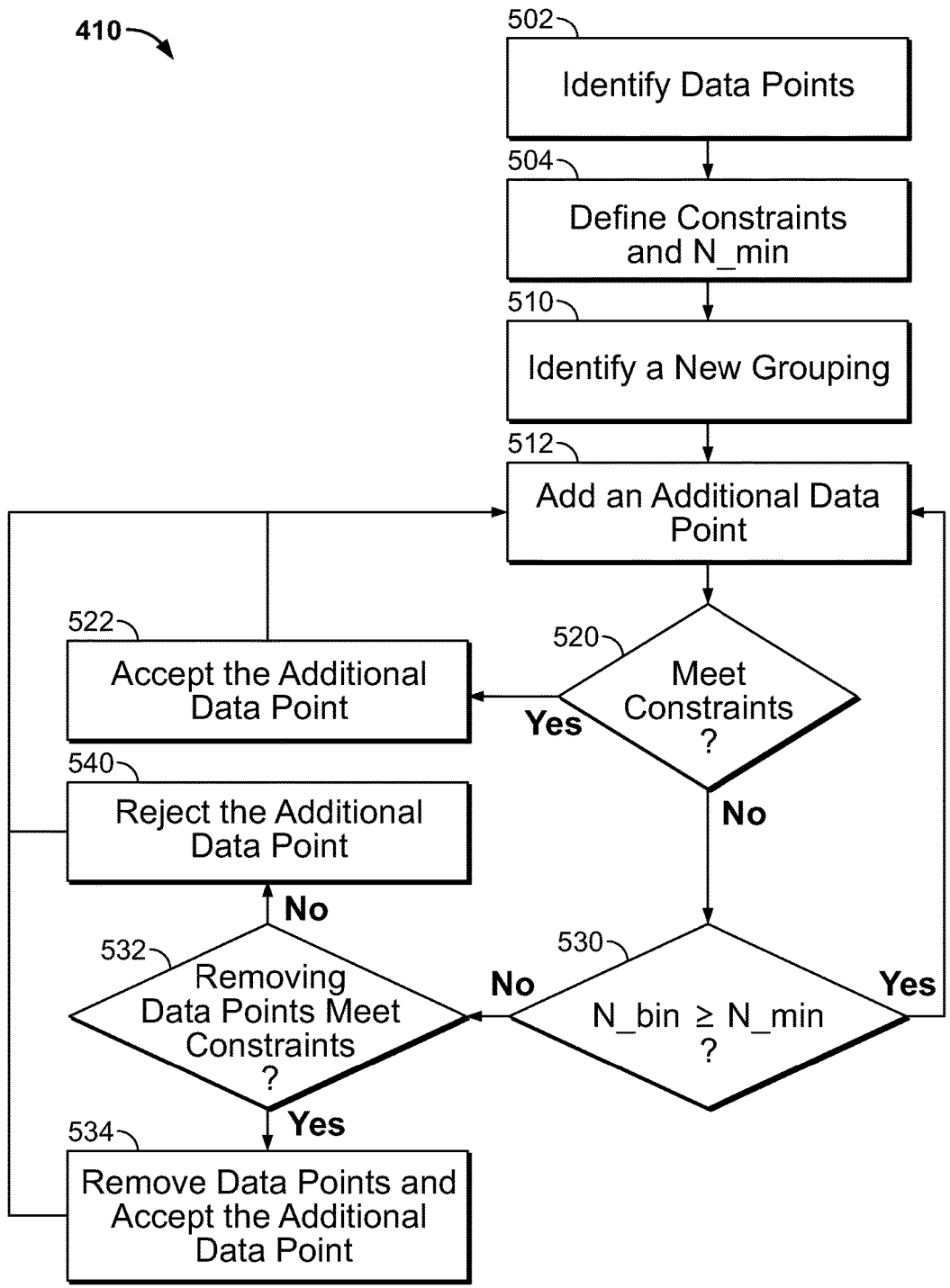
FIG. 5 is a flow chart of an example iterative technique for identifying groupings of data points.

In some implementations, the orientation ranges for each grouping are pre-computed values. For example, the grouping can be determined independent of the basic plane orientations. In some implementations, groupings are determined based on the orientations of the basic planes identified at 406. For example, as shown in FIG. 4, the basic planes can be sorted based on the orientation values at 408, and the groupings can be identified from the sorted basic planes at 410 (e.g., using the technique shown in FIG. 5 or another technique). The groupings can be identified at 410 in a number of different manners. FIG. 5, discussed in more detail below, depicts an example of an iterative method for identifying groupings of data points.

The quantity of basic plane orientations in each grouping can be a probability value, a frequency value, an integer number of planes, or another type of value. For example, the quantity of basic planes in a given grouping can be the number of basic planes having a basic plane orientation associated to the given grouping. As another example, the quantity of basic planes in a given grouping can be the number of basic planes having a basic plane orientation associated to the given orientation range, divided by the total number of basic planes identified. The quantities can be normalized, for example, so that the quantities sum to one (or another normalization value).

At 414, dominant fracture orientations are identified from the quantities calculated at 412. The dominant fracture orientations can be identified, for example, as the groupings having the local higher maxima of basic plane orientations. In some cases, the dominant fracture orientations are identified based on the local maxima in histogram data generated from the quantities. A single dominant fracture orientation can be identified, or multiple dominant fracture orientations can be identified. In some cases, a dominant fracture orientation is identified based on the height, width, and other parameters of a peak in the histogram data. The dominant fracture orientation can be identified as the center point of a grouping, the dominant fracture orientation can be computed as the mean orientation of basic planes in the grouping, or the dominant fracture orientation can be computed in another manner.

A dominant fracture orientation identified from the quantities calculated at 412 can represent the orientation of physical fractures within the subterranean zone. In some rock formations, fractures typically form in sets (or families) having parallel or similar orientations. Some formations include multiple sets of fractures. For example, a formation may include a first set of fractures having a primary orientation, which may be dictated by a maximum stress direction. A formation may also include a second set of fractures having a secondary orientation, which is different from the primary orientation. The secondary orientation may be separated from the primary orientation, for example, by ninety degrees or by another angle. In some cases, each of the dominant fracture orientations corresponds to the orientation of a fracture set in a subterranean zone.

At 416, a histogram of the basic plane orientation values is displayed. The histogram indicates the quantity of basic plane orientations in each of the groupings. An example histogram is shown in FIG. 2. The quantities can be displayed in another format or as another type of histogram. A histogram can be plotted, for example, in two dimensions or three dimensions. In some cases, the histogram is plotted as a continuous line or surface, as an array of discrete glyphs (e.g., a bar chart), as topographical regions, or as another type of graphical presentation. In addition to presenting a histogram, or as an alternative to presenting a histogram, the basic plane orientation values can be presented as numerical values, algebraic values, a numerical table, or in another format.

At 418, fracture planes are generated. The fracture planes can be generated, for example, based on the microseismic data points and the dominant fracture orientations identified at 414. In some cases, a grouping of microseismic events associated with each of the dominant fracture orientations is identified, and a fracture plane is generated from each grouping. In some cases, the fracture planes are identified based on the locations and other parameters of the measured microseismic events. For example, a fracture can be generated by fitting the individual groupings of microseismic events to a plane. Other techniques can be used to generate a fracture plane.

In some cases, the histogram is displayed in real time during the fracture treatment, and the histogram can be updated dynamically as additional microseismic events are detected. For example, each time a new microseismic event is received, additional basic planes can be identified and the quantity of basic planes in each grouping can be updated accordingly. In some cases, the groupings are also updated dynamically as microseismic data is received.

FIG. 5 shows an example process 410 for identifying groupings of data points. The example process 410 can be implemented as an iterative process that receives a set of data points, and groups the data points according to predetermined criteria or constraints. In some implementations, the data points represent basic plane orientations or other parameters of basic planes, or the data points may represent other information based on microseismic data from a fracture treatment.

Some or all of the operations in the example process 410 shown in FIG. 5 can be implemented by one or more computing devices. In some implementations, the process 410 may include additional, fewer, or different operations performed in the same or a different order. Moreover, one or more of the individual operations or subsets of the operations in the process 410 can be performed in isolation or in other contexts. Output data generated by the process 410, including output generated by intermediate operations, can include stored, displayed, printed, transmitted, communicated or processed information.

In the example shown in FIG. 5, the groupings are iteratively determined by repeatedly identifying groupings and adding data points or removing data points (or both) in each grouping based on predetermined constraints. In some cases, the predetermined constraints can include a minimum number of data points in a grouping, a maximum extent of variation of the data points in each grouping, or a combination of these and other constraints. The minimum number of data points can refer to a threshold number of data points that must be included in some or all of the groupings. For example, the minimum number of data points can be a constant integer value for all groupings. The maximum extent of variation can refer to a maximum extent to which the data points in an individual grouping, on average, are permitted to deviate from the other data points in the grouping. For example, the maximum extent of variation can be a maximum standard deviation or another measure of variance. For example, the following equation describes n groupings in a given set of data points, where the $i^{th}$ grouping is supported by $N_i$ data points:

$$[n, N_i|_{i=1}^n] = f(N_{min}, \sigma_{bin}) \qquad (3)$$

where $N_{min}$ represents the minimum number of data points in a grouping and the $\sigma_{bin}$ represents the local standard deviation associated with the grouping. In some implementations, some or all of the predetermined constraints can be specific to one or more groupings. In some implementations, the predetermined constraints are the same for all groupings.

In some cases, an "un-associated" (UA) grouping can be identified. The UA grouping may include one or more data points that cannot be added to any of the other groupings without preventing the grouping to meet the predetermined constraints. In some cases, the UA grouping can be a measure of the quality of the collected data set. For example, a high number of data points in the UA grouping may indicate that the data set includes a lot of "noises." In some cases, the data points in the UA grouping are not included in the further steps of calculating the qualities of basic planes (e.g., 412 in FIG. 4).

To this end, at 502, multiple data points are identified. As described previously, the data points can be generated based on microseismic data from a subterranean region. In some cases, the data points may represent basic planes, each defined by a coplanar subset of microseismic events and having an orientation relative to a common axis. As described previously, in some cases, the data points can be sorted based on orientation values of the basic planes (e.g., at 408 in FIG. 4); or the data point can be unsorted.

At 504, one or more predetermined constraints are determined In the example shown, the predetermined constraints include $N_{min}$, the minimum number of data points in a grouping. In some implementations, the one or more predetermined constraints can include a maximum extent of variation of the data points in a grouping. In some implementations, $N_{min}$ and the other predetermined constraints can be determined independent of the data points. In some implementations, one or more of the predetermined constraints can be determined based on the data points, for example, based on the number of the data points, the mean of the data points, the standard deviation of the data points, or other characteristics of the data points. In some implementations, one or more predetermined constraints can be determined based on user inputs, based on information stored in databases or calculated in real time, or other information.

In the example shown in FIG. 5, operations 510, 512, 520, 522, 530, 532, 534 and 540 can be iterated for each grouping to be identified. In some cases, the iterations can end when all the data points in the data set are allocated to their respective groupings or identified as unassociated. The example iterative process in FIG. 5 begins at 510, where a new grouping, here the first grouping, is identified. In some cases, a minimum number of data points are identified to be included in the first grouping. For example, the first grouping may include the first $N_{min}$ number of data points in the data set.

At 512, an additional data point is added to the current grouping. In some cases, the additional data point can be the next data point after the first $N_{min}$ number of data points in the data set. At 520, the first grouping, accounting for the additional data point, is evaluated to determine whether the first grouping meets the predetermined constraints. For example, the extent of variation of the first grouping can be calculated to determine whether the predetermined maximum extent of variation is exceeded. In some implementations, as described previously, the maximum extent of variation can be a maximum standard deviation. In such a case, the standard deviation of the first grouping, accounting for the additional data point, is calculated and compared to the maximum standard deviation. If the standard deviation of the first grouping, accounting for the additional data point, does not exceed the maximum standard deviation, at 522, the additional data point is accepted in the first grouping.

Operations 512, 520, and 522 are repeated for each additional data point being added, until the current grouping no longer meets the predetermined constraints. When the first grouping does not meet the predetermined constraints, at 530, the number of data points in the first grouping is compared to the minimum number of data points in a grouping to determine whether the first grouping has sufficient number of data points. For example, if the predetermined constraints include a maximum standard deviation, and the current grouping, accounting for the additional data point, has a standard deviation that is larger than the maximum standard deviation, the additional data point will not be accepted in the first grouping. Instead, at 530, the number of data points in the first grouping is compared to $N_{min}$. If the number of data points in the first grouping is greater than or equal to $N_{min}$, the first grouping has sufficient number of data points. In such a case, the iterative process proceeds to 510, where a subsequent grouping is identified. In some cases, the subsequent groupings include the next minimum number of data points in the data set. The iterative process may then continue to 512 and 520, where an additional data point is added to the subsequent grouping, and the subsequent grouping is evaluated to determine whether the subsequent grouping meets the predetermined constraints.

If the number of data points in a grouping (e.g., the first grouping or the subsequent grouping) is determined to be smaller than $N_{min}$ (e.g., at 530), one or more data points in the grouping may be removed. At 532, a further determination is made to evaluate whether removing one or more data points in the grouping can cause the grouping to meet the predetermined constraints. In some implementations, the extent of variation of the grouping, excluding one or more data points but accounting for the additional data point, is compared to the extent of variation of the grouping without the additional data point. For example, if the predetermined constraints include a maximum standard deviation and the data points in the grouping are sorted, a temporary standard deviation of the grouping, excluding the first data point but including the additional data point, is calculated. The temporary standard deviation is then compared to the standard deviation of the grouping that includes the first data point but excludes the additional data point. If the temporary standard deviation is greater than or equal to the standard deviation, removing data points does not decrease the extent of variation of the grouping. Therefore, removing data points does not cause the grouping to meet the predetermined constraints.

If the temporary standard deviation is smaller than the standard deviation, removing the first data point may decrease the extent of variation of the grouping. In such a case, further tests can be performed to determine whether removing one or more data points may cause the grouping to meet the predetermined constraints. For example, the temporary standard deviation can be compared with the maximum standard deviation. If the temporary standard deviation does not exceed the maximum standard deviation, removing the first data point does cause the grouping to meet the predetermined constraints. If the temporary standard deviation exceeds the maximum standard deviation, a second temporary standard deviation may be calculated. The second temporary standard deviation may be calculated based on the data points in the grouping that exclude the first two data points but include the additional data point. The second temporary standard deviation may be compared to the temporary standard deviation to determine whether removing the second data point continues to decrease the extent of variation of the grouping. If the second temporary standard deviation is greater than or equal to the temporary standard deviation, removing the second data point does not further reduce the extent of variation of the grouping, and therefore removing data points does not cause the grouping to meet the predetermined constraints. If the second temporary standard deviation is smaller than the temporary standard deviation, removing the second data point continues to reduce the extent of variation of the grouping. In such a case, the second temporary standard deviation can be compared with the maximum standard deviation to determine whether the predetermined constraints are met. This process may be repeated until it is determined whether removing one or more data points can cause the grouping to meet the predetermined constraints.

If removing one or more data points in the grouping causes the grouping, accounting for the additional data point, to meet the predetermined constraints, at 534 the one or more data points are removed from the grouping and the additional data point is accepted in the grouping. The removed data points can be allocated to the UA grouping. The iterative process continues to 512, where an additional data point is added, and further tests are performed to determine whether the grouping has at least $N_{min}$ number of data points and meets the predetermined constraints.

If removing one or more data points in the grouping does not cause the grouping, accounting for the additional data point, to meet the predetermined constraints, at 540, the additional data point is rejected. The rejected data point can be allocated to the UA grouping. The example iterative process continues to 512, where an additional data point is added.

In some instances, the operations 512-540 can be repeated for each additional data point being added, until a grouping meets the predetermined constraints. In such a case, the iterative process continues to 510, where a subsequent grouping is identified. The operations 510-540 can be repeated until all the data points in the data set are allocated to their respective groupings.

As described previously, operations 520 and 532 can include repeated evaluations of standard deviations. In some implementations, the standard deviation can be computed by evaluating the mean and then calculating the standard deviation. For example, the standard deviation ($\sigma$) of data points ($X_i$) in a grouping including N data points can be computed based on the following equations, where $\mu$ represents the mean of the grouping:

$$\mu = \frac{\sum_i X_i}{N} \quad (4)$$

-continued $$\sigma = \sqrt{\frac{1}{N}\sum_i (X_i - \mu)^2} \quad (5)$$

In some implementations, the standard deviation may be calculated in an incremental manner to take advantage of the fact that the data points are added to a grouping incrementally. Such a method may be more efficient and therefore may save computational cost. For example, a subsequent mean ($\mu_n$) and a subsequent standard deviation ($\sigma_n$) of a grouping of n data points, including an additional data point ($X_n$), can be computed based on the mean ($\mu_{n-1}$) and the standard deviation ($\sigma_{n-1}$) of the grouping that does not include the additional data point. The following equations are examples of this technique:

$$\mu_n = \mu_{n-1} + \frac{X_n - \mu_{n-1}}{n} \quad (6)$$

$$M_{2,n} = M_{2,n-1} + (X_n - \mu_{n-1})(X_n - \mu_n), \quad (7)$$

$$\text{where } M_{2,n-1} = \sum_i^{n-1} (X_i - \mu_{n-1})^2$$

$$\sigma = \sqrt{M_{2,n}/n} \quad (8)$$

In some implementations, parallel algorithms can be used to further speed-up the calculations.

Bins can be identified from the groupings of data points. In some cases, each grouping can correspond to a respective bin in the histogram, and can subsequently be used in operations 412-418 of FIG. 4 described above to identify dominant fracture orientations, generate a histogram of the basic plane orientations, and generate fracture planes.

In some implementations, the grouping techniques described in connection with FIG. 4 can be adapted to the known properties about the data points in the data set. For example, a user may know that a grouping that meets the predetermined constraints and has a minimum number of data points does not exist in some regions. In such a case, all the data points in these regions may be allocated directly to the UA grouping. Alternatively or in combination, the predetermined constraints and the minimum number of data points may be tuned for data points in these regions to adjust for the known properties of these regions.

The grouping techniques described in connection with FIG. 5, can be performed on real-time data, post data, or a combination of real-time and post data. In instances where the grouping is performed on real-time (or other non-post data), the algorithms can be operated to update the identified fracture orientations as new data comes in. When new data comes in, whether it is a single microseismic event or multiple microseismic events, the techniques described in connection with FIG. 4 and FIG. 5 can be performed to generate updated fracture planes and/or generate an updated histogram of the basic plane orientations. In some cases, grouping techniques can reach the same solution regardless of whether the analysis is performed on entirely post data, on partially post data and partially non-post data, or on entirely non-post data (including, real-time data).

In instances where the initial data points are grouped with an adaptive technique, such as described in connection with FIG. 5, assimilating a new data point into the groupings can necessitate some or all of the groupings be redefined. For example, including a new data point in an existing grouping may change the extent of variation of the grouping. The change may prevent the grouping from meeting the predetermined constraints. In some cases, one or more data points may be removed from the grouping to cause the grouping to meet the predetermined constraints. The removed data points may be included in adjacent groupings, which may in turn prevent the adjacent groupings from meeting the predetermined constraints. Therefore, as new data points are assimilated into the groupings, the groupings may be re-evaluated and the existing data points re-associated with different groupings. In some cases, the new data points and/or the removed data points can be allocated to the UA grouping.

Figure 6A:
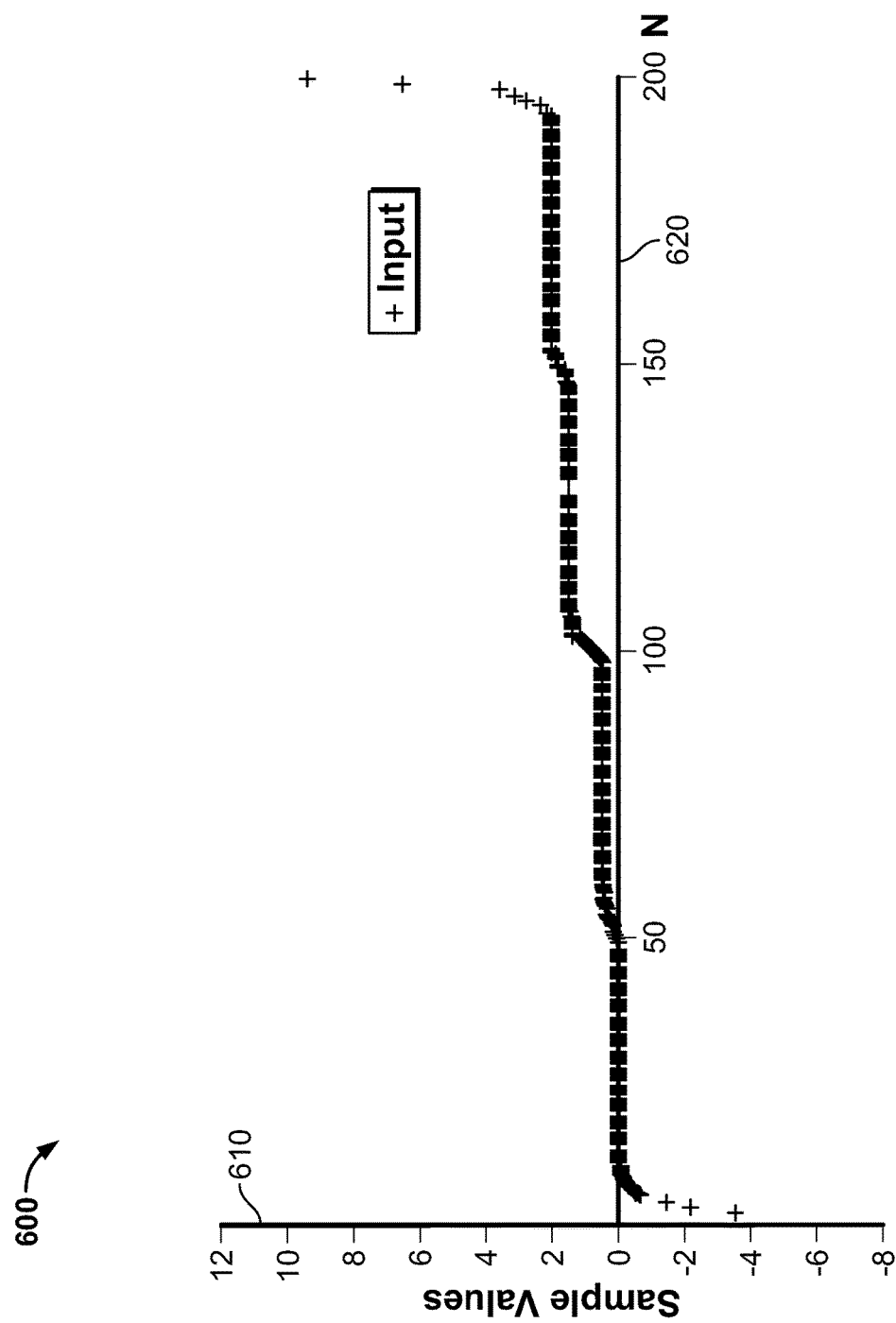
FIG. 6A is a plot showing an example data set.

FIG. 6A is a plot showing an example data set 600. The plot shown in FIG. 6A is a graphical representation of the distribution of data points in the example data set 600. In some cases, data points in the example data set 600 can represent microseismic data gathered from a hydraulic fracturing process, or another type of data. For example, the sample values of the data points can represent basic plane orientations or other information derived from microseismic data. In the example shown in FIG. 6A, a two-dimensional coordinate system is represented by the horizontal axis 620 and the vertical axis 610. The horizontal axis 620 represents the index of data points in the example data set 600. The vertical axis 610 represents the values of the data points in the example data set 600.

Figure 6B:
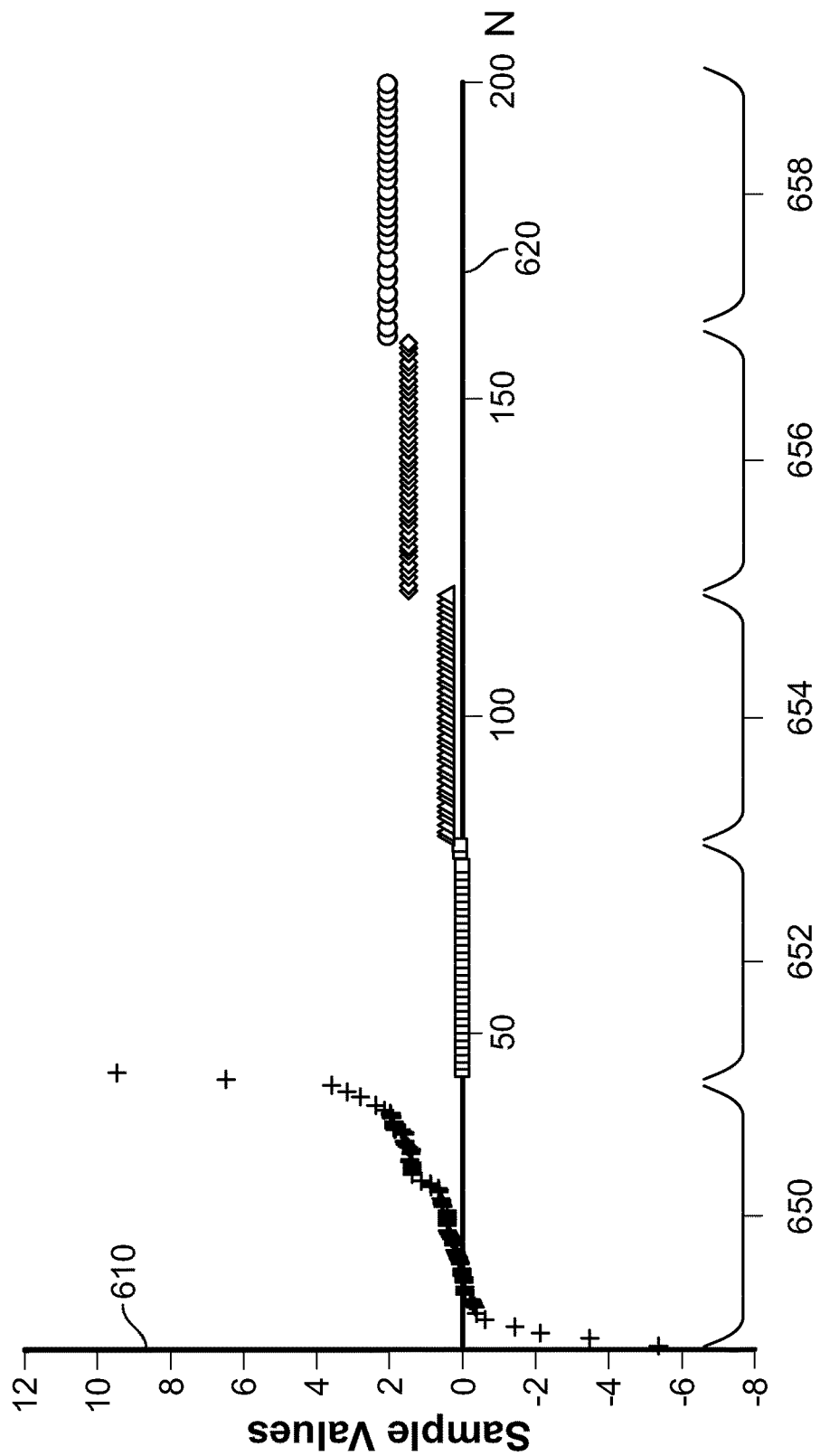
FIG. 6B is a plot showing groupings of the data points in the example data set of FIG. 6A according to an example grouping technique.

FIG. 6B is a plot showing groupings of data points in the example data set 600 of FIG. 6A according to the example process 500 shown in FIG. 5. In the example shown in FIG. 6B, groupings 650, 652, 654, 656 and 658 are identified. The UA grouping 650 includes data points that may represent unsuitable data (e.g., noise) for further calculation. In the example shown, the grouping technique identifies four distinct patterns and allocates data points into the groupings 652, 654, 656, and 658 according to these patterns. Each of the groupings 652, 654, 656, and 656 has different characteristics, which may indicate four fracture planes based on the seismic data gathered from the hydraulic fracturing process.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. A computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of examples have been described. Various modifications can be made without departing from the scope of the present disclosure. Accordingly, other embodiments are within the scope of the following claims.

What is claimed is:

1. A method for processing microseismic data from a subterranean region, the method comprising:
   identifying, by operation of a computer system, groupings of data points, the data points based on microseismic data from a subterranean region; and
   constraining the identification of the groupings such that each grouping includes at least a minimum number of the data points, and such that the data points in each grouping have at most a maximum extent of variation, wherein:
      identifying the groupings comprises:
         identifying a first grouping containing the minimum number of data points;
         adding additional data points to the first grouping as long as the data points in the first grouping have at most the maximum extent of variation when accounting for the additional data points; and
         identifying subsequent groupings by an iterative process that includes, for each subsequent grouping:
            identifying the subsequent grouping containing the minimum number of data points; and
            adding additional data points to the subsequent grouping as long as the data points in the subsequent grouping have at most the maximum extent of variation when accounting for the additional data points;
      the identified constrained groupings of data points generate, in real-time, updated fracture planes induced by a fracturing treatment; and
      the fracturing treatment is modified, in real-time, by the updated fracture planes.

2. The method of claim 1, wherein the data points represent basic planes, each defined by a coplanar subset of microseismic events and having an orientation relative to a common axis, and the method comprises identifying the basic planes from the microseismic data.

3. The method of claim 2, comprising:
identifying the number of basic planes in each of the groupings; and
identifying a dominant fracture plane orientation based on the number of basic planes in one or more of the groupings.

4. The method of claim 1, comprising generating a histogram based on the groupings, wherein each grouping corresponds to a respective bin in the histogram.

5. The method of claim 1, wherein the iterative process includes, for each subsequent grouping:
if adding additional data points causes the subsequent grouping to exceed the maximum extent of variation when accounting for the additional data points, and
if removing one or more data points from the subsequent grouping decreases the extent of variation of the subsequent grouping when accounting for the additional data points, as compared to the extent of variation of the subsequent grouping without the additional data points,
adding the additional data points to the subsequent grouping while removing the one or more data points from the subsequent grouping.

6. The method of claim 5, wherein the iterative process includes identifying a subset of the data points that cannot be added to any of the groupings without causing the grouping to exceed the maximum extent of variation.

7. The method of claim 1, comprising defining, independent of the data points, the maximum extent of variation and the minimum number of data points.

8. The method of claim 1, wherein the maximum extent of variation comprises a maximum standard deviation.

9. A computing system comprising:
data processing apparatus; and
memory storing computer-readable instructions that, when executed by the data processing apparatus, cause the data processing apparatus to perform operations comprising:
identifying groupings of data points, the data points based on microseismic data from a subterranean region; and
constraining the identification of the groupings such that each grouping includes at least a minimum number of the data points, and such that the data points in each grouping have at most a maximum extent of variation, wherein:
identifying the groupings comprises:
identifying a first grouping containing the minimum number of data points;
adding additional data points to the first grouping as long as the data points in the first grouping have at most the maximum extent of variation when accounting for the additional data points; and
identifying subsequent groupings by an iterative process that includes, for each subsequent grouping:
identifying the subsequent grouping containing the minimum number of data points; and
adding additional data points to the subsequent grouping as long as the data points in the subsequent grouping have at most the maximum extent of variation when accounting for the additional data points;
the identified constrained groupings of data points generate, in real-time, updated fracture planes induced by a fracturing treatment; and
the fracturing treatment is modified, in real-time, by the updated fracture planes.

10. The computing system of claim 9, wherein the data points represent basic planes, each defined by a coplanar subset of microseismic events and having an orientation relative to a common axis, and the operations comprise:
identifying the basic planes from the microseismic data;
identifying the number of basic planes in each of the groupings; and
identifying a dominant fracture orientation based on the number of basic planes in one or more of the groupings.

11. The computing system of claim 9, wherein the operations further comprises generating a histogram based on the groupings, wherein each grouping corresponds to a respective bin in the histogram.

12. The computing system of claim 9, wherein the operations further comprises defining, independent of the data points, the maximum extent of variation and the minimum number of data points, and wherein the maximum extent of variation comprises a maximum standard deviation.

13. A non-transitory computer-readable medium storing instructions that, when executed by data processing apparatus, cause the data processing apparatus to perform operations comprising:
identifying groupings of data points, the data points based on microseismic data from a subterranean region; and
constraining the identification of the groupings such that each grouping includes at least a minimum number of the data points, and such that the data points in each grouping have at most a maximum extent of variation, wherein:
identifying the groupings comprises:
identifying a first grouping containing the minimum number of data points;
adding additional data points to the first grouping as long as the data points in the first grouping have at most the maximum extent of variation when accounting for the additional data points; and
identifying subsequent groupings by an iterative process that includes, for each subsequent grouping:
identifying the subsequent grouping containing the minimum number of data points; and
adding additional data points to the subsequent grouping as long as the data points in the subsequent grouping have at most the maximum extent of variation when accounting for the additional data points;
the identified constrained groupings of data points generate, in real-time, updated fracture planes induced by a fracturing treatment; and
the fracturing treatment is modified, in real-time, by the updated fracture planes.

14. The non-transitory computer-readable medium of claim 13, wherein the data points represent basic planes, each defined by a coplanar subset of microseismic events and having an orientation relative to a common axis, and the operations comprise:
identifying the basic planes from the microseismic data;
identifying the number of basic planes in each of the groupings; and
identifying a dominant orientation based on the number of basic planes in one or more of the groupings.

15. The non-transitory computer-readable medium of claim 13, wherein the operations further comprise generating a histogram based on the groupings, wherein each grouping corresponds to a respective bin in the histogram.

16. The non-transitory computer-readable medium of claim 13, wherein the operations further comprise defining, independent of the data points, the maximum extent of variation and the minimum number of data points, and wherein the maximum extent of variation comprises a maximum standard deviation.

\* \* \* \* \*